United States Patent [19]

Baldwin et al.

[11] Patent Number: 5,039,009

[45] Date of Patent: Aug. 13, 1991

[54] THERMOSTAT INTERFACE FOR A REFRIGERATION SYSTEM CONTROLLER

[75] Inventors: Joe M. Baldwin, Clarksville, Tenn.; Merle A. Renaud; Alan G. Metcalfe, both of Onalaska, Wis.

[73] Assignee: American Standard Inc., New York, N.Y.

[21] Appl. No.: 554,223

[22] Filed: Jul. 16, 1990

[51] Int. Cl.5 ............................................. G05D 23/00
[52] U.S. Cl. ........................................ 236/51; 62/298; 340/870.17
[58] Field of Search ...................... 62/298, 77; 236/51; 307/39, 85, 86; 340/825.39, 870.17

[56] References Cited

U.S. PATENT DOCUMENTS

| | | | |
|---|---|---|---|
| 4,449,375 | 5/1984 | Briccetti | 62/89 |
| 4,829,779 | 5/1989 | Manson et al. | 236/51 X |
| 4,889,179 | 12/1989 | Merenda | 236/51 X |

Primary Examiner—Harry B. Tanner
Attorney, Agent, or Firm—William J. Beres; William O'Driscoll

[57] ABSTRACT

An interface for use between a thermostat and a controller for an HVAC system comprising: means for receiving a plurality of parallel commands from a thermostat where each command represents one of two possible states; means for coverting each of the plurality of parallel commands into a plurality of predetermined values; means for combining the predetermined values in a predetermined manner; and means for transmitting the combined predetermined values to the controller.

19 Claims, 8 Drawing Sheets

FIG. 8

TABLE 1

|  | COOLING ('O' LINE ON) | | HEATING ('O' LINE OFF) | |
|---|---|---|---|---|
|  | ECONOMIZER FEASIBLE | ECONOMIZER NOT FEASIBLE | HEAT PUMP | WITHOUT HEAT PUMP |
| Y1 | DAMPER MAXIMUM OPEN | TURN ON C1 | TURN ON C1 + C2 | TURN ON C1 + C2 |
| Y2 | TURN ON C1 | TURN ON C2 | N/A | N/A |
| W1 | N/A | N/A | N/A | TURN ON H1 |
| W2/X | N/A | N/A | TURN ON H1 + H2 TURN OFF C1, C2, CFA, CFB | TURN ON H2 |
| AUX | N/A | N/A | TURN ON H1 + H2 | N/A |
| G | TURN ON SUPPLY FAN | | | |
| O | COOLING MODE | | HEATING MODE | |

FIG. 9

TABLE 2

| | CSP | HSP | ZTEMP | VOLTAGE RATIOS |
|---|---|---|---|---|
| SHORT | | | | |
| LEVEL 1,+2,+3 | | W1 + W2/X + AUX | | .39 |
| LEVEL 2 + 3 | | W1 + AUX | | .42 |
| LEVEL 1 + 3 | | W1 + W2/X | | .47 |
| LEVEL 1 + 2 | Y1 + Y2 | W2/X + AUX | G + O | .51 |
| LEVEL 3 | | W1 | | .56 |
| LEVEL 2 | Y2 | AUX | O | .63 |
| LEVEL 1 | Y1 | W2/X | G | .72-.74 |
| OPEN | | | | |

THERMOSTAT INTERFACE FOR A REFRIGERATION SYSTEM CONTROLLER

TECHNICAL DATA

The present invention is directed to refrigeration system controllers and more particularly, to an interface which allows a thermostat, which transmits commands indicative of one of two possible states, to control a controller which receives an analog input.

BACKGROUND OF THE INVENTION

Residential and some commercial heating, ventilating and air conditioning systems provide a thermostat to control the residential heating and cooling requirements. The thermostat is located in the zone to be controlled and typically includes mercury switches which change state in response to temperature conditions. The state is transmitted to a component of the refrigeration system in the form of a command to assume or to remain in that state. The commands transmitted by the thermostat do not contain any inherent information other than the refrigeration system component should be in a particular state. For example, typical commands transmitted by the thermostat might indicate that the heating or cooling equipment should be either on or off. Such a system is shown in U.S. Pat. No. 4,449,375 to Briccetti where a thermostat directly interfaces with a controller and selectively provides signals to the controller when fan or compressor operation is desired.

Most commercial HVAC systems provide an intelligent controller which is usually located in physical proximity to the compressor portion of the refrigeration system. This controller is provided with sensors extending into the zone to be controlled. These sensors provide such information as actual zone temperature, desired zone temperature in the form of setpoints for heating and cooling, and the desired mode of operation. The information is supplied as a quantitative value in either analog or digital form and the system controller thereafter makes decisions as to how the refrigeration system should be controlled.

The thermostat and the intelligent controller are basically incompatible because the thermostat transmits a desired state in the form of a command, while the intelligent controller requires information in the form of a quantitative value. Effectively the decision making process for the thermostat occurs in the zone to be controlled and the decisions are made by the thermostat using mercury switches or the equivalent. On the other hand, the decision making process for the controller occurs within the controller using sensory information from the zone to be controlled.

For a variety of reasons, it is desirable to allow thermostats to interface with intelligent controllers. Such reasons include upgrades to existing applications where an intelligent controller is added to the system but the original thermostats remain unchanged, and situations where a user is required to use a particular thermostat to meet either code or contractual requirements.

SUMMARY OF THE INVENTION

It is an object of the present invention to solve the problems of prior art refrigeration system controllers in receiving zone information.

It is a further object, feature and advantage of the present invention to allow a thermostat transmitting discrete command information to be used in conjunction with an HVAC system controller requiring a value, such as an analog signal, to be input.

The present invention provides an interface for use between a thermostat and a controller for an HVAC system comprising: means for receiving a plurality of parallel commands from a thermostat where each command represents one of two possible states; means for converting each of the plurality of parallel commands into a plurality of predetermined values; means for combining the predetermined values in a predetermined manner; and means for transmitting the combined predetermined values to the controller.

The present invention provides a method for controlling an HVAC system including a thermostat which transmits discrete change of state information and a system controller which accepts analog information as an input. The method comprises the steps of: receiving the discrete change of state information from the thermostat in an interface; converting the discrete change of state information into predetermined analog values; combining selected predetermined values in a predetermined fashion; and transmitting the combined selected values to the system controller.

The present invention provides a system for controlling an HVAC system comprising a thermostat, an interface, and a controller. The thermostat including a temperature sensor, a mode selector, at least one set- point selector, means for generating commands in response to the temperature sensor, the mode selector and the set point selector, and means, responsive to the command generating means, for transmitting a plurality of commands in parallel on a plurality of transmission lines. The interface includes means for receiving the plurality of commands from the thermostat on said plurality of transmission lines, means for converting said plurality of commands to predetermined analog values, means for transmitting an identification signal to a controller, means for combining the converted commands in a preselected manner, and means for transmitting the combined commands to a controller. The controller is operatively connected to the interface and includes means for recognizing the identification signal, means for receiving the combined commands, and means for controlling a compressor, a condenser, and condenser fans in response to the combined signals.

The present invention provides a method of converting parallel digital commands to parallel analog information comprising the steps of: acquiring information relative to a zone whose climate is to be controlled; generating, using the acquired information, a plurality of commands indicative of the desired states of particular pieces of heating, ventilating or air conditioning equipment; transmitting the commands in parallel on a plurality of wires; receiving the plurality of commands in an interface; converting each of the plurality of commands to predetermined analog values; combining the predetermined analog values in a predetermined manner; transmitting the combined selected values to the controller; receiving the combined selected values in the controller; using the combined selected values as indices to a system command look up table having system commands; and controlling an HVAC system in accordance with the system commands in the look up table.

BRIEF DESCRIPTION OF THE DRAWINGS

FIG. 8 shows Table 1, which is a table of the actions taken by the controller of the present invention for particular HVAC system configurations in response to particular inputs from a thermostat.

FIG. 9 shows Table 2, which is a table showing how the input voltage ratios on the cooling setpoint line, the heating setpoint line and the zone temperature line to the system controller are identified as specific requests from the thermostat.

DETAILED DESCRIPTION OF THE INVENTION

Figure 1:
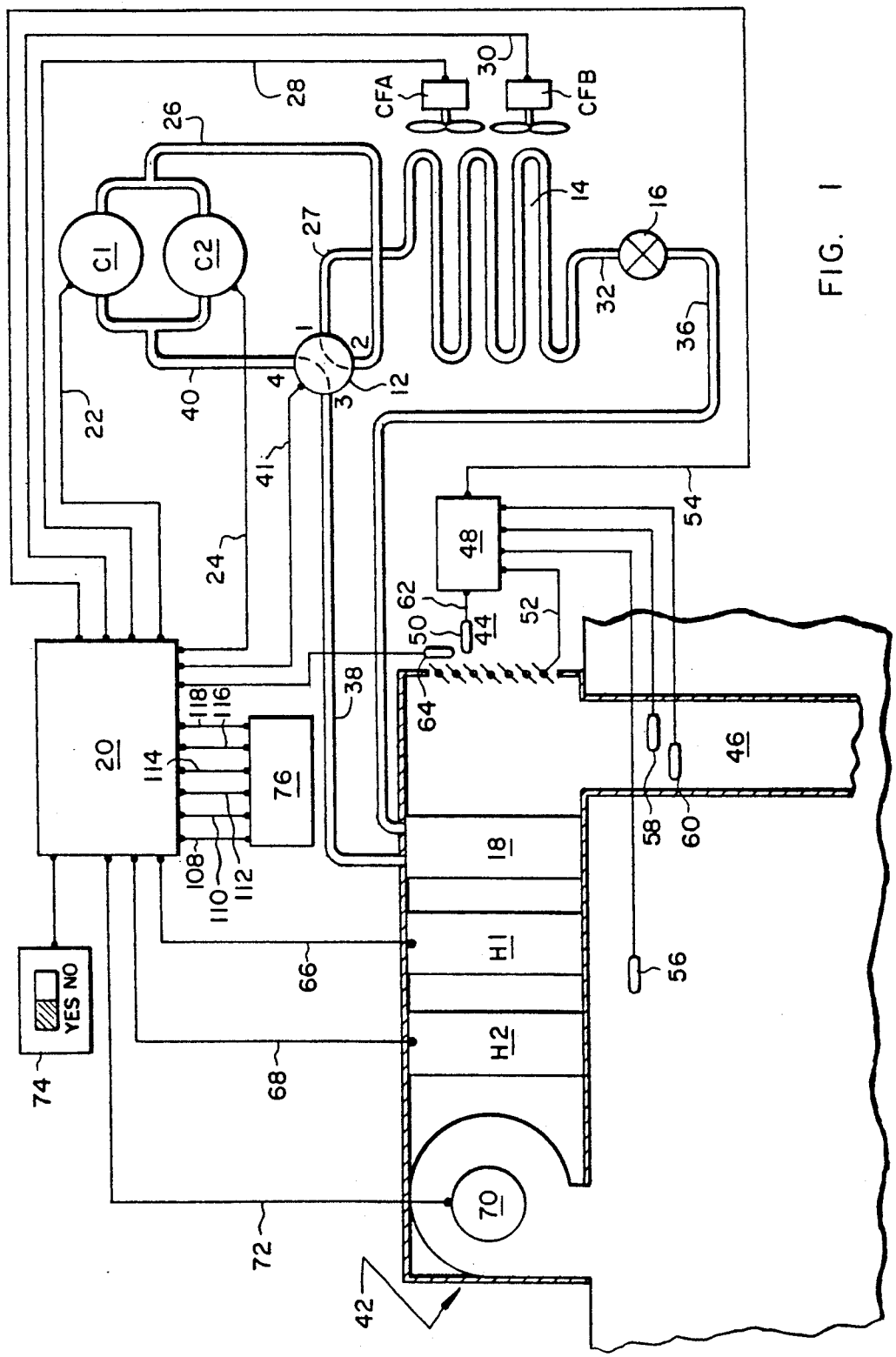
FIG. 1 shows a refrigeration system including a controller which receives information from a zone sensor.

FIG. 1 shows an HVAC system 10 including a first compressor C1, a second compressor C2, a reversing valve 12, an outdoor heat exchanger 14, an expansion device such as an expansion valve 16, an indoor heat exchanger 18, and a system controller 20. The HVAC system, as shown in FIG. 1, is configured as a heat pump system with two compressors and two stages of auxiliary heat. However, the present invention is directed to providing a conventional thermostat interface to the system controller 20. Consequently, the configuration of the actual HVAC system can vary considerably in the number of compressors and heaters. Additionally, the HVAC system can be configured as a cooling only system.

In FIG. 1 the compressor C1 and C2 are connected in parallel and are selectively energized by the system controller 20 using electrical lines 22 and 24 respectively. A refrigerant line 26 leaving the compressors C1 and C2 is connected through ports 1 and 2 of the reversing valve 12 and a refrigerant line 27 to the outdoor heat exchanger 14 when the reversing valve 12 is in the cooling mode as shown in the configuration of FIG. 1. The outdoor heat exchanger 14 is cooled by two condensing fans CFA and CFB, each of which is independently connected to and controlled by the system controller 20 using electrical lines 28 and 30 respectively. A refrigerant line 32 leaving the outdoor heat exchanger 14 is connected to the expansion valve 16. The expansion valve 16 is connected to the indoor heat exchanger 18 by a refrigerant line 36. A refrigerant line 38 from the indoor heat exchanger 18 is connected through ports 3 and 4 of the reversing valve 12 to the compressors C1 and C2 by means of refrigerant line 40.

In the heating mode the system controller 20 controls the reversing valve 12 by means of an electrical line 41 so that the refrigerant line 26 leaving the compressors C1 and C2 is connected to the refrigerant line 38 and the indoor heat exchanger 18 through ports 2 and 3 of the reversing valve 12. The indoor heat exchanger 18 exchanges heat with the air passing over it, and cooled refrigerant leaves the indoor heat exchanger 18 passing along the refrigerant line 36 to the expansion valve 16. From the expansion valve 16 the refrigerant enters the outdoor heat exchanger 14 by means of the refrigerant line 32 where the refrigerant absorbs heat and vaporizes. The vaporized refrigerant returns to the compressors C1 and C2 through the refrigerant line 27, ports 1 and 4 of the reversing valve and the refrigerant line 40.

The HVAC system 10 also includes an air handling unit 42 having an outside air connection 44 and a return air connection 46. An economizer 48 mixes the outside air and the return air using damper 50 by means of an electrical line 52. The economizer 48 is connected to the system controller 20 by an electrical connection 54 and includes sensors to sense supply air temperature 56, return air temperature 58, return air humidity 60, and outside air humidity 62. Also, the system controller 20 is connected to an outside air temperature sensor 64. After the outside air and the return air has been mixed by the economizer 48, the mixed air passes over the coils of the indoor heat exchanger 18. The mixed air then passes over a first auxiliary heater H1 and a second auxiliary heater H2, each of which are connected to the system controller by an electrical line 66 and 68 respectively. Finally, a supply fan 70 impels the mixed air into the space to be cooled. The supply air fan 70 is operably connected to the controller 20 by means of an electrical line 72. The system controller 20 also includes an input 74 which provides an indication of whether the HVAC system 10 is configured for a heat pump or not.

The system controller 20 includes a microprocessor, such as a NEC series 7800, having both read only memory (ROM) and random access memory (RAM). Typically, the system controller 20 is an intelligent device which accepts inputs, makes decisions, and issues commands to the various elements of the HVAC system 10. The inputs to the system controller 20 from a zone sensor 76 include a zone temperature input ZTEMP, a cooling setpoint CSP, a heating setpoint HSP, and a mode of operation input MODE for selecting operating modes such as, for example, EMERGENCY HEAT, HEAT, AUTO, COOL or OFF. These inputs are respectively received by the controller 20 on electrical lines 110. 112, 114 and 116 in the form of analog values which the controller 20 then uses in its decision making processes. The controller 20 also includes a common line 118.

Although the description herein refers to connections from the controller 20 without allusion to intermediate contactors or the like, all connections other than the outside air fans are typically indirectly controlled.

Figure 2:
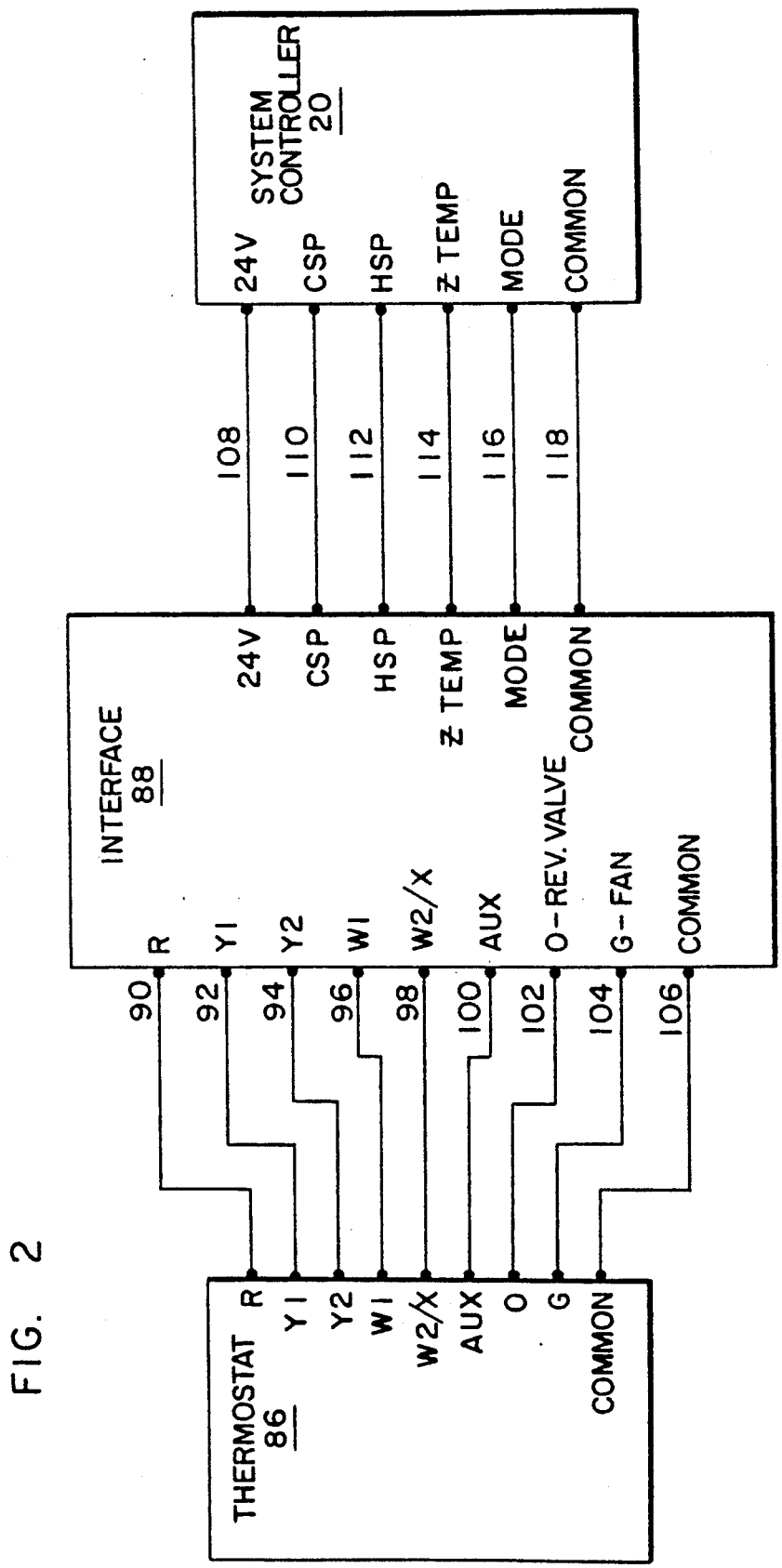
FIG. 2 shows the controller of FIG. 1 including a thermostat and the interface of the present invention in place of the zone sensor.

FIG. 2 shows the system controller 20, a thermostat 86, and the interface 88 of the present invention.

The thermostat 86 typically includes connections labeled R, $Y_1$, $Y_2$, $W_1$, $W_2$/X. AUX, O, G, and COMMON, each of which is directly connected to the interface 88 by means of electrical lines 90, 92, 94, 96, 98, 100, 102, 104, and 106 respectively. Examples of thermostats 86 include Honeywell Model T874D1082, ENERSTAT Models MS-1N and Hp-1N, and GE Model 3AAT83E12A1.

In a refrigeration system directly controlled by a thermostat, mercury switches or the like within the thermostat 86 respond to temperature changes by changing state and thereby transmitting commands to system elements by means of electrical lines 92 through 104. When the temperature in the space to be cooled exceeds a certain value, a mercury switch trips and causes a line to go from low to high. For instance, in a thermostat type system the G line 106 is directly connected to a supply fan and turns the supply fan on whenever the G line 36 goes high. Similarly the O line 102 is connected to a reversing valve, and the $Y_1$ and $Y_2$ lines 92, 94 are connected to first and second compressors. In previous non-heat pump thermostat type systems the $W_1$ and $W_2$ lines 96, 98 are connected to first and second heaters respectively. In a heat pump thermostat type system the X (emergency heat) line 100 is connected to the heaters, and disconnects the compressors and the condenser fans, while the AUX line is connected to the heaters. The R line 90 is used to provide a power supply to the thermostat 86.

In contrast to a system lacking an intelligent controller, the system controller 20 in the present invention expects to receive information in the form of analog values which the controller 20 can use to make decisions relating to the operation of the HVAC system. Consequently, the interface 88 of the present invention is provided between the thermostat 86 and the system controller 20 to resolve the problem of having two separate decision making devices in the same system. As previously noted and as is shown in FIG. 2, the connections between the thermostat 86 and the interface 88 are in one to one correspondence, with the exception that in the present invention the $W_2$ and X lines have been combined since these lines are never used at the same time. Similarly, the connections between the system controller 20 and the interface 88 are also in one-to-one correspondence. Between the interface 88 and the system controller 20, an electrical line 108 is used as a power line, an electrical line 110 connects the cooling setpoint connection CSP and an electrical line 112 connects the heating setpoint connection HSP. Also, an electrical line 114 provides the zone temperature connection ZTEMP, an electrical line 116 provides the MODE connection and an electrical line 118 provides a common connection.

Figure 3:
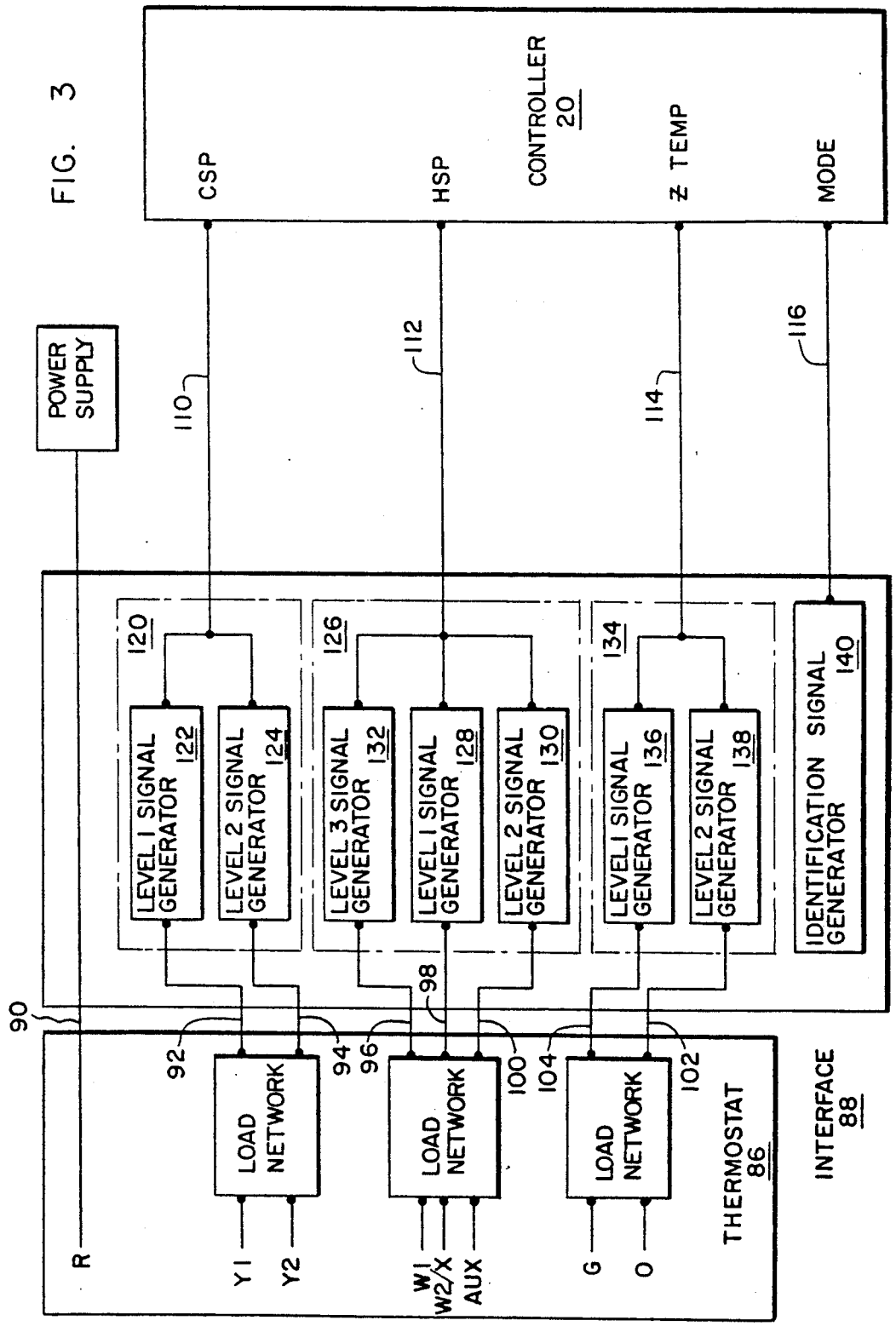
FIG. 3 shows a block diagram of the interface of the present invention.

The interface 88 is shown in block diagram in FIG. 3 where the $Y_1$ and $Y_2$ output lines 92, 94 from the thermostat 86 are combined by a command-to-analog conversion block 120 within the interface 88 into a single analog output on the cooling setpoint line 110. If the incoming signal on the $Y_1$ input line 92 is high, a level 1 signal generator 122 generates a level 1 signal on the CSP line 110. Similarly, if the incoming signal on the $Y_2$ input line 94 is high, a level 2 signal generator 124 generator a level 2 signal on the CSP line 110. The level 1 and level 2 signals are selected so that each signal, and the combination of the level 1 and 2 signals, generates a unique signal when applied to the CSP line 110. The controller 20 can monitor the CSP line 110 for one of four states: no signal, a level 1 signal, a level 2 signal or a combined level 1 and 2 signal, and recognize that these signal states respectively indicate that the $Y_1$ and $Y_2$ input lines 93, 94 are low, that the $Y_1$ input line 92 is high, that the $Y_2$ input line 94 is high or that the $Y_1$ and $Y_2$ input lines 92, 94 are both high.

Similarly, the $W_1$ line 96, the combined $W_2$/X line 98, and the AUX line 100 outputs of the thermostat 86 are combined by a command-to-analog conversion block 126 into a single analog output on the heating setpoint line 112. If the incoming signal on the $W_1$ input line 96 is high, a level 3 signal generator 132 generates a level 3 signal on the HSP line 112. If the incoming signal on the $W_2$/X line 98 is high, a level 1 signal generator 128 generates a level 1 signal on the HSP line 112. If the incoming signal on the AUX line 100 is high, a level 2 signal generator 130 generates a level 2 signal on the HSP line 112. The level 1, 2 and 3 signals are selected so that each signal and each combination of signals generates a unique signal when applied to the HSP line 112. This allows the controller 20 to monitor the HSP line 112 for one of eight states: no signal, a level 1 signal, a level 2 signal, a level 3 signal, a level 1 and 2 signal, a level 1 and 3 signal, a level 2 and 3 signal, or a level 1 and 2 and 3 signal. The controller 20 respectively equates these eight states to recognize that the $W_1$, $W_2$/X and AUX input lines 96, 98, 100 are low, that the $W_2$/X input line 98 is high, that the AUX input line 100 is high, that the $W_1$ input line 96 is high, that the W2/X and AUX input lines 98, 100 are high, that the W2/X and W1 input lines 98, 96 are high, that the AUX and W1 input lines 100, 96 are high, or that the W2/X, AUX and W1 input lines 98, 100, 96 are all high.

In the interface 88, the G and O output lines 102, 104 of the thermostat 86 are combined by a command-to-analog conversion block 124 of the interface 88 into a single analog output on the ZTEMP line 114. If the incoming signal on the G input line 104 is high, a level 1 signal generator 136 generates a level 1 signal on the ZTEMP line 114. If the incoming signal on the O input line 102 is high, a level 2 signal generator 138 generates a level 2 signal on the ZTEMP line 114. The level 1 and 2 signals are selected so that each signal, and the combination of signals, generates a unique signal when applied to the ZTEMP line 114. The controller 20 can monitor the ZTEMP line 114 for one of four states: no signal, a level 1 signal, a level 2 signal, or a level 1 and 2 signal, and recognize that these signal states respectively indicate that the G and O input lines 104, 102 are low, that the G input line 104 is high, that the O input line 102 is high, or that the G and O input lines 104, 102 are both high. A device for transmitting an identification signal, such as an oscillator 126 which transmits a square wave at a predetermined frequency on the mode line 116, allows the system controller 20 to recognize the presence of the interface 88 within the HVAC system 10.

The level 1, 2 and 3 signals are chosen using two related criteria. The level 1, 2 and 3 signals, and any combination thereof, must provide a plurality of unique signals to the controller 20 so that a voltage divider 146, 148, 150 in the controller 20 can provide a plurality of unique voltage ratios which identify the thermostat commands to the controller 20. Generation of the unique level 1, 2 and 3 signals is described in connection with FIGS. 4 and 5 hereafter. However, these unique signals need only be unique to the particular input line 110, 112, 114. Consequently, the level 1 signal, for example, on the CSP line 110 can differ in value from the level 1 signal on the HSP line 112. In the preferred embodiment of the present invention as shown in Table 2, the voltage dividers 146, 148 and 150 are selected so that the voltage ratio of the level 1, 2 and 3 signals, and their combinations, are approximately the same for the CSP, HSP and ZTEMP lines 110, 112, 114. This allows the controller 20 to use the same logic and the same voltage ratios to recognize signals in each line 110, 112, 114. As previously stated, different logic and voltage ratios could be used for each line 110, 112, 114 if desired.

Figure 4:
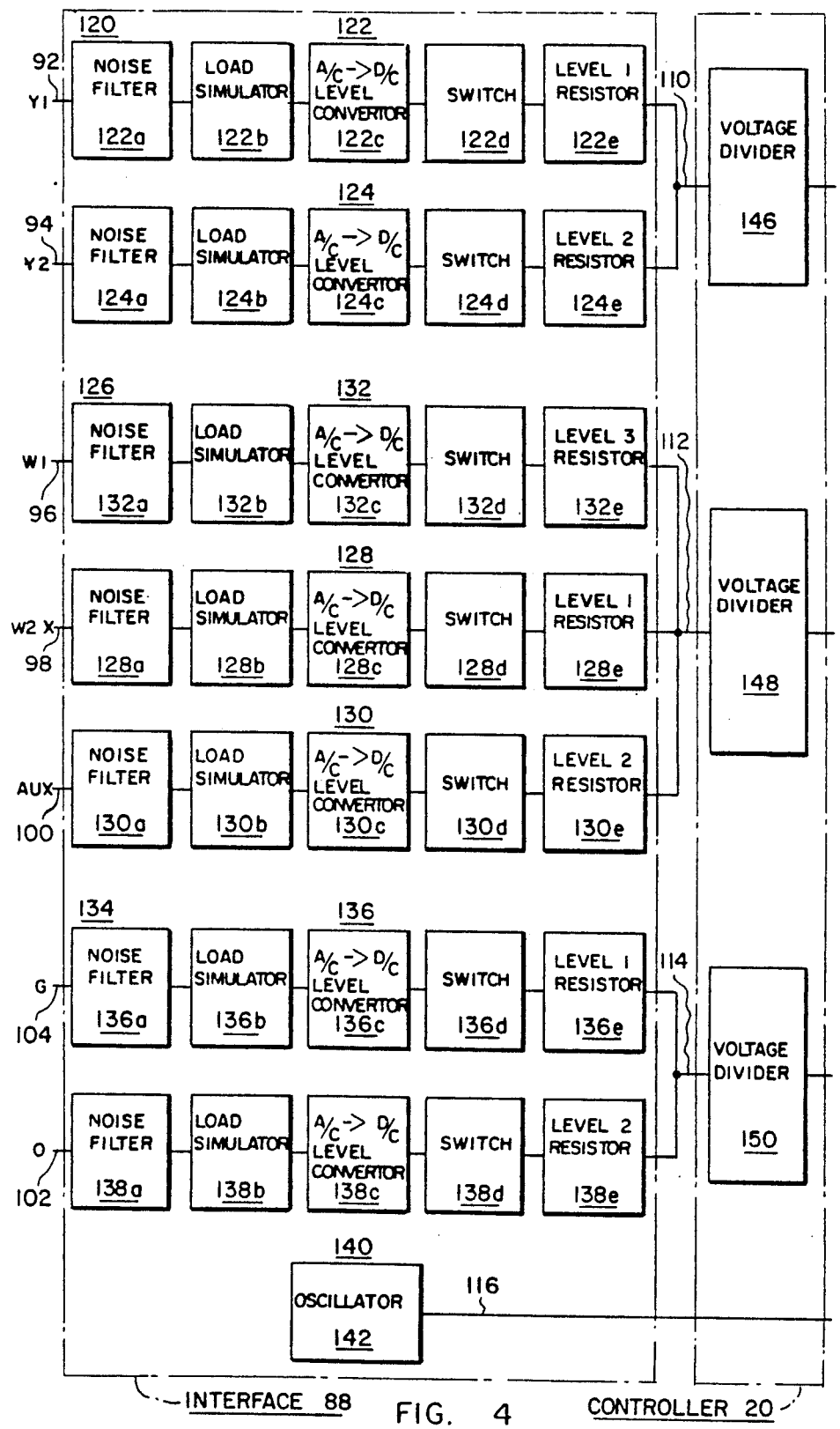
FIG. 4 shows a more specific block diagram of the interface of the present invention.

FIG. 4 shows a diagram of the interface 88 including a block diagram of the various signal generators used in blocks 120, 126 and 134 as well as block 140.

Each of the level signal generators 122, 124, 132, 128, 130, 136, 138 is shown as including five parts: a noise filter 122a, 124a, 132a, 128a, 130a, 136a, 138a; a load simulator 122b 124b, 132b, 128b 130b, 136b, 138b; an AC to DC level converter 122c, 124c, 132c, 128c, 130c, 136c, 138c; a switch 122d, 124d, 132d, 128d, 130d, 136d, 138d; and a level resistor 122e, 124e, 132e, 128e, 130e, 136e, 138e. The noise filter 122a, 124a, 132a, 128a, 130a, 136a, 138a is implemented in the preferred embodiment with a capacitor to COMMON. Similarly a resistor to COMMON implements the load simulator 122b, 124b, 132b, 128b, 130b, 136b, 138b to provide an appropriate anticipation current and thereby simulate an actual thermostat load. The AC to DC level converter 122c, 124c, 132c, 128c, 130c, 136c, 138c typically includes a voltage reducing portion in the form of a series resistor, a rectifier, and a filter. The switch 122d, 124d, 132d, 128d, 130d, 136d, 138d is implemented by any device, such as a switching transistor, which causes the input line 110, 112, 114 to change states from high to low or from low to high in response to a similar change of state on the thermostat line 92-104. The level resistor 122e, 124e, 132e, 128e, 130e, 136e, 138e establishes a voltage on the CSP, HSP or ZTEMP input line 110, 112, 114 which, with or without inputs from the other level generators 122, 124, 132, 128, 130, 136, 138, acts in conjunction with a voltage divider 146, 148, 150 to indicate to the system controller 20 the status of the thermostat lines 92-104.

Table 2 shows how the voltage ratio is used to identify the status of the thermostat lines 90 and 92. Table 1 shows the actions taken for particular HVAC system configurations once a thermostat line status is identified.

FIG. 4 also shows an identification signal generator block 140 which including an oscillator 142 which generates a square wave at a predetermined frequency on the mode line 116. When the system controller receives this square wave, the system controller 20 recognizes that the thermostat 86 and the interface 88 has been installed in the HVAC system 10. Consequently the system controller 20 uses the operating algorithm described in FIG. 7 below to control the HVAC system 10.

Figure 5:
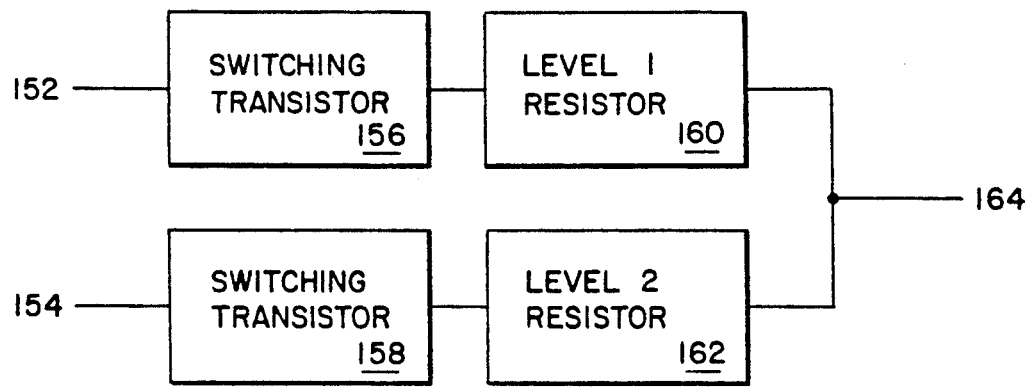
FIG. 5 shows a simplified diagram of a two input line to one output line conversion portion of the interface of the present invention.

FIG. 5 is a simplified diagram of either of blocks 120 or 134, showing a two line to one line conversion portion of the preferred embodiment of the present invention. A pair of thermostat lines 152, 154 provide high or low inputs from a thermostat 86. A pair of switching transistors 156, 158 respectively conduct if the thermostat lines 152, 154 are high. If the thermostat line 152 is high, the switching transistor 156 is on allowing a voltage to flow through a level 1 resistor 160 to the controller input line 164. Similarly, if the thermostat input line 154 is high the switching transistor 158 conducts and allows a voltage to flow through a level 2 resistor 162 and provides a proportional voltage on the controller input line 164. As previously stated the level 1 and level 2 resistors are selected so that, individually or in combination, unique signals are provided on the controller input line 164, allowing the controller 20 to recognize the thermostat 86 state. For example, a level 1 resistor of 2.87 K in conjunction with a level 2 resistor of 1.65 K and a 1 K resistor in the voltage divider circuit provides a level 1 voltage ratio of approximately 0.74, a level 2 voltage ratio of approximately 0.63, and a level 1 and level 2 combined voltage ratio of 0.52. Together with an open on the interface line to the controller 20 the controller 20 can easily identify one of four states and take whatever action is appropriate.

Figure 6:
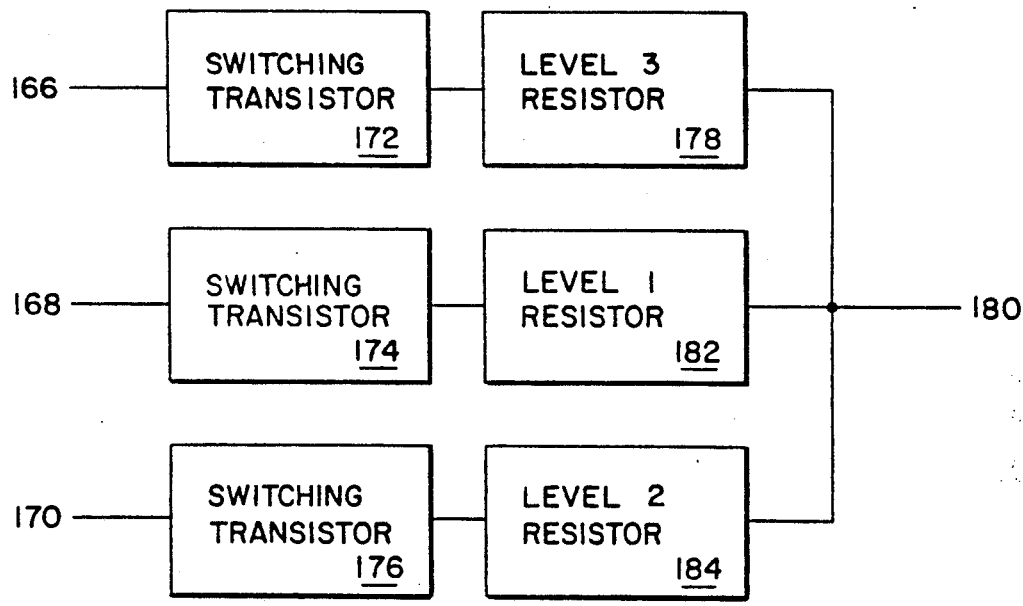
FIG. 6 shows a simplified diagram of a three input line to one output line conversion portion of the interface of the present invention.

FIG. 6 is a simplified diagram representative of block 126 showing a three to one line conversion portion of the present invention. Three thermostat lines 166, 168, 170 provide a high or low signal to respective switching transistors 172, 174, 176. If for example the thermostat line 166 is high the respective switching transistor 172 is on and provides a voltage through a level 3 resistor 178 to a controller input line 180. Similarly if thermostat line 168 is high, the switching transistor 174 is on and provides a voltage through a level 1 resistor 182 to the controller input line 180. If the thermostat line 170 is high, the switching transistor 176 is on and provides a voltage through a level 2 resistor 184 to the controller input line 180. As previously stated the level 1, 2, and 3 resistors are selected so that, individually or in combination, these resistors provide unique signals to the system controller 20 via the system controller input line 180.

Figure 7:
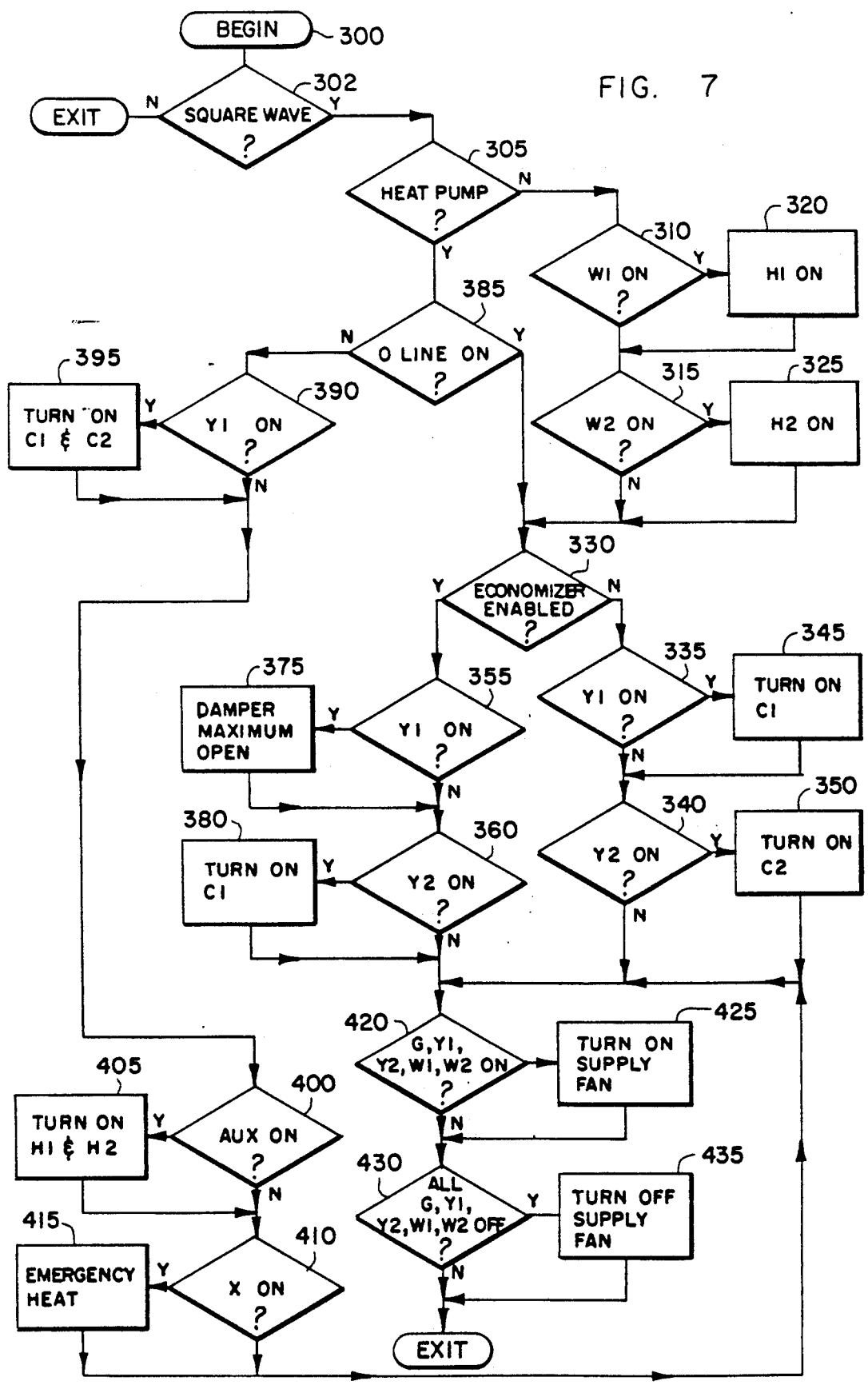
FIG. 7 is an operational flow chart showing the present invention.

Referring now to FIG. 7 and Table 1, the modified operating mode of the system controller 20 will now be described. This modified operating mode begins at step 300 in FIG. 5 and is implemented after the signals on the cooling setpoint line 110, the heating setpoint line 112, and the Ztemp line 114 have been received and indexed into Table 1. Initially, at step 302, the system controller 20 recognizes the identifying signal transmitted on the mode line 116 to alert the system controller 20 that a thermostat 86 and the interface 88 are in the HVAC system 10. Next the system controller 20 determines if it is configured as a heat pump at step 305. If the HVAC system is not configured as a heat pump then the $W_1$ line and $W_2$ lines are checked at steps 310 and 315 respectively to determine whether heat is called for. If the $W_1$ line is on then the heater $H_1$ is turned on at step 320, while if the $W_2$ line is on then the heater $H_2$ is turned at in step 325. Next a check is made at step 330 to determine if the system is configured as an economizer. If not, lines $Y_1$ and $Y_2$ are checked at steps 335 and 340 respectively to determine if the compressors $C_1$ and $C_2$ should be turned on at steps 345 and 350. If the system was determined to be configured as an economizer at step 330, then lines $Y_1$ and $Y_2$ are checked at steps 355 and 360 respectively to determine if the outside air damper 50 should be open to its maximum at step 365 and whether the compressor $C_1$ turned on at step 380.

Returning to step 305, if the HVAC system 10 is configured as a heat pump system then the position of the reversing valve 12 is determined by checking the status of the 0 line at step 385. If cooling is called for, the portion of the algorithm described above starting at step 330 is implemented. However, if the O line is off as determined at step 385 then the $Y_1$ line is checked at step 390. If the $Y_1$ line is on, the compressors $C_1$ and $C_2$ are turned on at step 395. Next, at step 400 the AUX line is checked and if the AUX line is on, the heaters $H_1$ and $H_2$ are turned on at step 405. Next, at step 410, the X line is checked to see if emergency heat is called for. If so at step 415 the heaters $H_1$ and $H_2$ are turned on, the compressors $C_1$ and $C_2$ are turned off, and the condenser fans CFA and CFB are turned off.

The results of any steps 410, 415, 360, 380, 340 or 350 all next determine at step 420 whether the supply fan 70 should be turned on. The supply fan 70 is turned on at step 425 if there is a call for either heating, cooling or a direct call for the supply fan itself on line G. If there is no call for heating cooling or for the supply fan 70 as determined at step 430, then the supply fan 70 is turned off at step 435 and the system controller 20 continues on to the next item in its control process.

What has been described above is an invention which allows an intelligent system controller for an HVAC system to interface with and, to some extent, be controlled by a thermostat. It should be recognized that many modifications and alterations are possible and that all such modifications and alterations are intended to be within the spirit and scope of the present invention.

What is desired to be secured by Letters Patent of the United States is claimed as follows:

1. An interface for use between a thermostat and a controller for an HVAC system comprising:
   means for receiving a plurality of parallel commands from a thermostat where each command represents one of two possible states;
   means for converting each of said plurality of parallel commands into a plurality of predetermined values;
   means for combining said predetermined values in a predetermined manner; and
   means for transmitting said combined predetermined values to the controller.

2. The interface of claim 1 further including means for signaling the controller that the interface is in use.

3. The interface of claim 2 where the predetermined value is an analog value.

4. The interface of claim 2 wherein the converting means includes means for assigning an analog value to each possible command state.

5. The interface of claim 4 wherein the combining means includes means for adding said analog values in a predetermined manner.

6. The interface of claim 4 wherein the assigning means includes a switching transistor and a resistor for each possible command state.

7. The interface of claim 6 wherein the signalling means includes an oscillator generating square waves at a predetermined frequency.

8. The interface of claim 2 wherein the signalling means includes an oscillator generating square waves at a predetermined frequency.

9. The interface of claim 1 wherein the receiving means includes a number of lines operably connected to a thermostat, the transmitting means includes a number of lines operably connected to a controller, and the number of lines receiving said plurality of commands is greater than the number of lines transmitting the predetermined values to the controller.

10. A method for controlling an HVAC system including a thermostat which transmits discrete change of state information and a system controller which accepts analog information as an input, comprising the steps of:
    receiving the discrete change of state information from the thermostat in an interface;
    converting the discrete change of state information into predetermined analog values;
    combining selected predetermined values in a predetermined fashion; and
    transmitting said combined selected values to the system controller.

11. The method of claim 10 including the further step of signaling the system controller that the interface is in use.

12. The method of claim 11 wherein the step of converting includes the step of using a switching device and a resistor to assign the predetermined analog values to the discrete change of state information.

13. The method of claim 10 including the further steps of:
    transmitting a signal to a system controller to indicate that the interface is operational;
    recognizing the operational status of the interface;
    receiving said combined selected signal;
    identifying said combined selected signals; and
    controlling the refrigeration system in accordance with the identified signals.

14. The system of claim 13 wherein the step of transmitting the operational status of the interface includes the step of transmitting a square wave at a predetermined frequency.

15. A system for controlling an HVAC system comprising a thermostat, an interface and a controller:
    the thermostat including a temperature sensor, a mode selector, at least one setpoint selector, means for generating commands in response to the temperature sensor, the mode selector and the set point selector, and means, responsive to said command generating means, for transmitting a plurality of commands in parallel on a plurality of transmission lines;
    the interface including means for receiving said plurality of commands from said thermostat on said plurality of transmission lines, means for converting said plurality of commands to predetermined analog values, means for transmitting an identification signal to a controller, means for combining said converted commands in a preselected manner, and means for transmitting said combined commands to the controller;
    the controller being operatively connected to said interface and including means for recognizing said identification signal, means for receiving said combined commands, and means for controlling a compressor, a condenser, and condenser fans in response to said combined signals.

16. The system of claim 15 wherein said converting means includes a switching device and a resistor for each of said plurality of transmission lines.

17. The system of claim 15 wherein said controlling means includes means for converting the combined commands into commands for controlling the HVAC system.

18. A method of converting parallel digital commands to parallel analog information comprising the steps of:
    acquiring information relative to a zone whose climate is to be controlled;
    generating, using the acquired information, a plurality of commands indicative of the desired states of particular pieces of heating, ventilating or air conditioning equipment;
    transmitting said commands in parallel on a plurality of wires;
    receiving the plurality of commands in an interface;
    converting each of the plurality of commands to predetermined analog values;
    combining the predetermined analog values in a predetermined manner;
    transmitting said combined selected values to the controller;
    receiving said combined selected values in the controller;

using the combined selected values as indices to a system command look up table having system commands; and controlling an HVAC system in accordance with the system commands in the look up table.

19. The method of claim 18 further including the steps of:
  generating an identification signal;
  transmitting said identification signal to a controller;
  receiving said transmitting identification signal in the controller; and
  recognizing the identification signal;

* * * * *